(12) United States Patent
Ha et al.

(10) Patent No.: US 12,725,346 B2
(45) **Date of Patent: *Sep. 1, 2026**

(54) IMAGE PROCESSING METHOD AND DEVICE USING THE SAME

(71) Applicant: SAMSUNG ELECTRONICS CO., LTD., Suwon-si (KR)

(72) Inventors: Inwoo Ha, Suwon-si (KR); Young Hun Sung, Suwon-si (KR); Nahyup Kang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 23 days.

This patent is subject to a terminal disclaimer.

(21) Appl. No.: 18/896,388

(22) Filed: Sep. 25, 2024

(65) Prior Publication Data

US 2025/0118004 A1 Apr. 10, 2025

(30) Foreign Application Priority Data

Oct. 6, 2023 (KR) ........................ 10-2023-0133364

(51) Int. Cl.
*G06T 15/06* (2011.01)
*G06T 3/18* (2024.01)

(52) U.S. Cl.
CPC ................ *G06T 15/06* (2013.01); *G06T 3/18* (2024.01)

(58) Field of Classification Search
CPC ... G06T 15/06; G06T 3/18; G06T 2219/2016; G06T 19/20; G06T 15/10; G06T 5/70; G06T 2207/20084
USPC .......................................................... 345/426
See application file for complete search history.

(56) References Cited

U.S. PATENT DOCUMENTS

2007/0053477 A1 3/2007 Ning
2019/0043243 A1 2/2019 Chui et al.
2019/0287291 A1 9/2019 Lin
2019/0287294 A1 9/2019 Liu et al.
(Continued)

FOREIGN PATENT DOCUMENTS

CN 116051704 A 5/2023

OTHER PUBLICATIONS

Hachisuka et al; Multidimensional adaptive sampling and reconstruction for ray tracing; ACM (Year: 2008).*

*Primary Examiner* — David T Welch
(74) *Attorney, Agent, or Firm* — Sughrue Mion, PLLC

(57) ABSTRACT

An image processing method includes generating warped image data by warping first reconstructed image data corresponding to a first time point, based on first change data corresponding to a change between first rendered image data corresponding to the first time point and second rendered image data corresponding to a second time point, generating a sampling map that designates a sampling number, a sampling position, or a combination of the sampling number and the sampling position, for each pixel of the second rendered image data corresponding to the second time point by executing a neural sampling map generation model based on the warped image data and scene context information, and rendering the second rendered image data corresponding to the second time point by performing ray tracing on each pixel of the second rendered image data corresponding to the second time point using the sampling map.

20 Claims, 10 Drawing Sheets

(56) References Cited

U.S. PATENT DOCUMENTS

2020/0184605 A1 6/2020 Vogels et al.
2022/0130101 A1 4/2022 Abramov
2023/0005211 A1 1/2023 Zhdan et al.
2023/0014245 A1* 1/2023 Munkberg ................ G06T 5/60
2023/0137408 A1 5/2023 Johnston et al.
2023/0146390 A1* 5/2023 Sadaka ..................... G06T 5/60 345/611
2023/0147063 A1* 5/2023 Kim ...................... G06T 3/4053 382/299
2023/0148225 A1* 5/2023 Thomas .................. G06T 15/06 345/428
2024/0095880 A1* 3/2024 Liu ........................ G06N 3/047
2024/0096050 A1* 3/2024 Ouyang .................... G06T 5/70

* cited by examiner

Super-sampled image data 510

521
S1 S1 • • •
S1 S1
• • •

522
S2 S2 • • •
S2 S2
• • •

523
S3 S3 • • •
S3 S3
• • •

524
S4 S4 • • •
S4 S4
• • •

Sub-image set 520

IMAGE PROCESSING METHOD AND DEVICE USING THE SAME

CROSS-REFERENCE TO RELATED APPLICATIONS

This application is based on and claims priority to Korean Patent Application No. 10-2023-0133364, filed on Oct. 6, 2023, in the Korean Intellectual Property Office, the disclosure of which is incorporated herein by reference in its entirety.

BACKGROUND

1. Field

The disclosure relates to an image processing method and a device using the same.

2. Description of Related Art

Three-dimensional (3D) rendering is a field of computer graphics for rendering a 3D scene into a two-dimensional (2D) image. 3D rendering may be used in various application fields, such as a 3D game, virtual reality, an animation, a movie, and the like. A neural network may be trained based on deep learning. Inference may then be performed for the desired purpose by mapping input data and data that are in a nonlinear relationship to each other may be output. A trained ability to generate such a mapping may be referred to as a learning ability of the neural network. The neural network may be used variously in technical fields related to image processing.

SUMMARY

Provided is a method, device, etc., that efficiently generates a sampling map designating a sampling number and/or a sampling position of a pixel of a rendered image for ray tracing, thereby improving performance of denoising and super-sampling.

Additional aspects will be set forth in part in the description which follows and, in part, will be apparent from the description, or may be learned by practice of the presented embodiments of the disclosure.

According to an aspect of the disclosure, an image processing method may include generating warped image data by warping first reconstructed image data corresponding to a first time point, based on first change data corresponding to a change between first rendered image data corresponding to the first time point and second rendered image data corresponding to a second time point, generating a sampling map that designates a sampling number, a sampling position, or a combination of the sampling number and the sampling position, for each pixel of the second rendered image data corresponding to the second time point by executing a neural sampling map generation model based on the warped image data and scene context information, rendering the second rendered image data corresponding to the second time point by performing ray tracing on each pixel of the second rendered image data corresponding to the second time point using the sampling map and generating second reconstructed image data corresponding to the second time point by executing a neural reconstruction model based on the second rendered image data corresponding to the second time point.

The neural reconstruction model may include a neural denoising model and a neural super-sampling model and the first reconstructed image data corresponding to the first time point may include denoised image data generated by the neural denoising model and super-sampled image data generated by the neural super-sampling model.

The warped image data may include warped denoised image data generated by warping the denoised image data and warped super-sampled image data generated by warping the super-sampled image data.

The super-sampled image data may be converted into a sub-image set by space-to-depth conversion and the warped super-sampled image data may be generated by warping the sub-image set.

The scene context information may include information about visual characteristics of a scene object represented by the second rendered image data corresponding to the second time point.

The first change data may include a motion vector of a corresponding pixel between the first rendered image data corresponding to the first time point and the second rendered image data corresponding to the second time point.

The rendering of the second rendered image data corresponding to the second time point may include generating path information of rays used for the ray tracing.

The information of the rays used for the ray tracing may include reflection information of the rays used for the ray tracing.

The generating of the second reconstructed image data corresponding to the second time point may include executing the neural reconstruction model based on the second rendered image data corresponding to the second time point and the path information of the rays used for the ray tracing.

The method may include generating warped path information by warping the path information of the rays used for the ray tracing based on the first change data.

The generating of the sampling map may include executing the neural sampling map generation model based on the warped image data, the scene context information, and the warped path information.

According to an aspect of the disclosure, an image processing method may include generating warped image data by warping first reconstructed image data corresponding to a first time point, based on first change data corresponding to a change between first rendered image data corresponding to the first time point and second rendered image data corresponding to a second time point, generating a sampling map that designates a sampling number, a sampling position, or a combination of the sampling number and the sampling position, for each pixel of the second rendered image data corresponding to the second time point by executing a neural sampling map generation model based on the warped image data, generating the second rendered image data corresponding to the second time point and path information of rays used for ray tracing by performing ray tracing on each pixel of the second rendered image data corresponding to the second time point using the sampling map, and generating second reconstructed image data corresponding to the second time point by executing a neural reconstruction model based on the second rendered image data corresponding to the second time point and the path information of the rays used for the ray tracing.

The path information of the rays used for the ray tracing may include reflection information of the rays used for ray tracing.

The method may include generating warped path information by warping the path information of the rays used for the ray tracing based on the first change data.

The generating of the sampling map may include executing the neural sampling map generation model based on the warped image data and the warped path information.

The neural reconstruction model may include a neural denoising model and a neural super-sampling model and the first reconstructed image data corresponding to the first time point may include denoised image data generated by the neural denoising model and super-sampled image data generated by the neural super-sampling model.

The warped image data may include warped denoised image data generated by warping the denoised image data and warped super-sampled image data generated by warping the super-sampled image data.

The generating of the sampling map may include executing the neural sampling map generation model based on the warped image data and scene context information.

According to an aspect of the disclosure, a non-transitory computer-readable storage medium may store instructions that, when executed by a processor, cause the processor to generate warped image data by warping first reconstructed image data corresponding to a first time point, based on first change data corresponding to a change between first rendered image data corresponding to the first time point and second rendered image data corresponding to a second time point, generate a sampling map that designates a sampling number, a sampling position, or a combination of the sampling number and the sampling position, for each pixel of the second rendered image data corresponding to the second time point by executing a neural sampling map generation model based on the warped image data and scene context information, render the second rendered image data corresponding to the second time point by performing ray tracing on each pixel of the second rendered image data corresponding to the second time point using the sampling map, and generate second reconstructed image data corresponding to the second time point by executing a neural reconstruction model based on the second rendered image data corresponding to the second time point.

According to an aspect of the disclosure, an electronic device may include a processor, and a memory configured to store instructions, where the instructions, when executed, cause the processor of the electronic device to generate warped image data by warping first reconstructed image data corresponding to a first time point based on first change data corresponding to a change between first rendered image data corresponding to the first time point and second rendered image data corresponding to a second time point, generate a sampling map that designates a sampling number, a sampling position, or a combination of the sampling number and the sampling position, for each pixel of the second rendered image data corresponding to the second time point by executing a neural sampling map generation model based on the warped image data and scene context information, render the second rendered image data corresponding the second time point by performing ray tracing on each pixel of the second rendered image data corresponding to the second time point using the sampling map, and generate second reconstructed image data corresponding to the second time point by executing a neural reconstruction model based on the second rendered image data corresponding to the second time point.

BRIEF DESCRIPTION OF DRAWINGS

The above and other aspects, features, and advantages of certain embodiments of the disclosure will be more apparent from the following description taken in conjunction with the accompanying drawings, in which.

DETAILED DESCRIPTION

Figure 1:
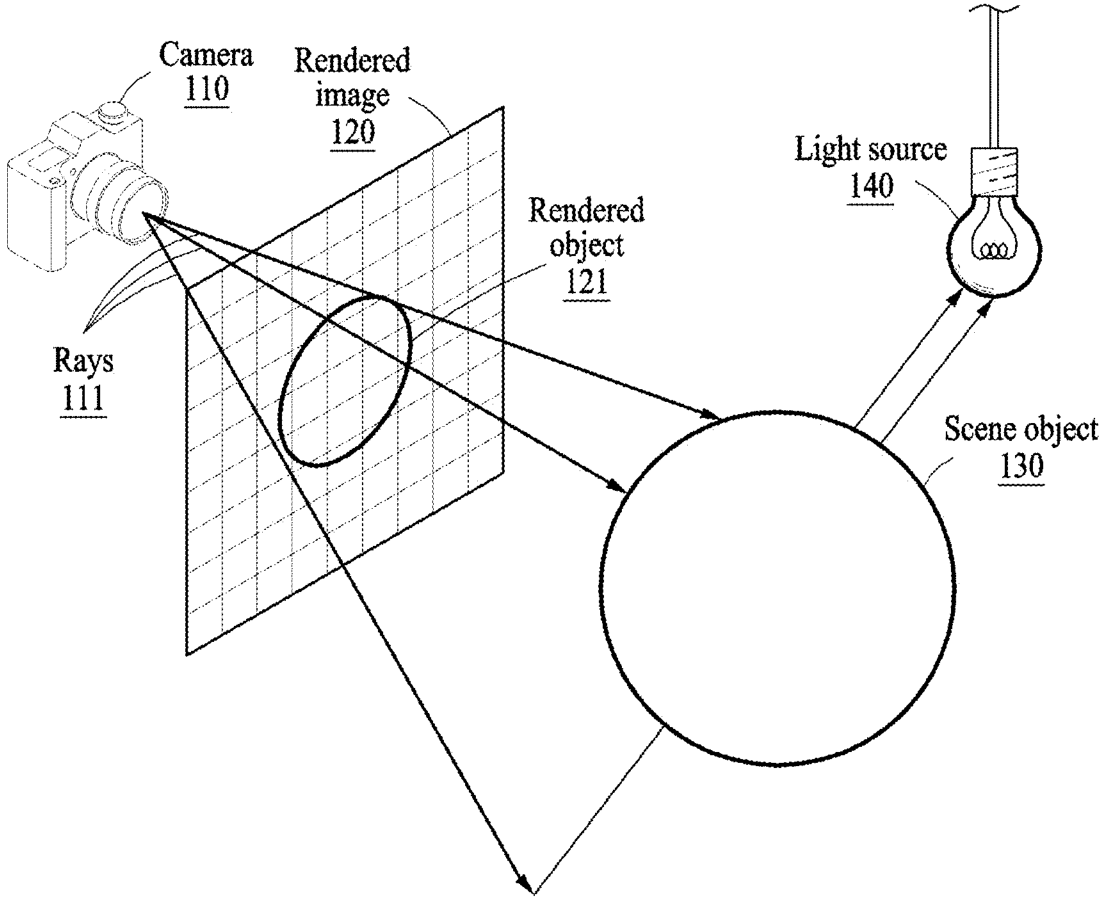
FIG. 1 is a diagram illustrating an example of a ray tracing-based rendering process according to an embodiment.

Reference will now be made in detail to embodiments, examples of which are illustrated in the accompanying drawings, where like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Hereinafter, example embodiments will be described in detail with reference to the accompanying drawings. The embodiments described below are merely exemplary, and various modifications are possible from these embodiments. In the following drawings, the same reference numerals refer to the same components, and the size of each component in the drawings may be exaggerated for clarity and convenience of description Although terms of "first," "second," and the like are used to explain various components, the components are not limited to such terms. These terms are used only to distinguish one component from another component. For example, a first component may be referred to as a second component, or similarly, the second component may be referred to as the first component within the scope of the present disclosure.

In the following description, when a component is referred to as being "above" or "on" another component, it may be directly on an upper, lower, left, or right side of the other component while making contact with the other component or may be above an upper, lower, left, or right side of the other component without making contact with the other component.

It should be noted that if it is described that one component is "connected", "coupled", or "joined" to another component, a third component may be "connected", "coupled", and "joined" between the first and second components, although the first component may be directly connected, coupled, or joined to the second component.

Terms such as first, second, etc. may be used to describe various components, but are used only for the purpose of distinguishing one component from another component. These terms do not limit the difference in the material or structure of the components The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

The terms of a singular form may include plural forms unless otherwise specified. In addition, when a certain part "includes" a certain component, it means that other components may be further included rather than excluding other components unless otherwise stated.

In addition, terms such as "unit" and "module" described in the specification may indicate a unit that processes at least one function or operation, and this may be implemented as hardware or software, or may be implemented as a combination of hardware and software The use of the term "the" and similar designating terms may correspond to both the singular and the plural.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Operations of a method may be performed in an appropriate order unless explicitly described in terms of order. In addition, the use of all illustrative terms (e.g., etc.) is merely for describing technical ideas in detail, and the scope is not limited by these examples or illustrative terms unless limited by the claims.

FIG. 1 is a diagram illustrating an example of a ray tracing-based rendering process according to an embodiment. Referring to FIG. 1, an electronic device may render a scene object 130 in a three-dimensional (3D) space based on a view point of a camera 110. A rendered image 120 may correspond to a result of such rendering. 3D rendering is a field of computer graphics for rendering a 3D scene such as the scene object 130 into a two-dimensional (2D) image such as the rendered image 120. According to the rendering, the scene object 130 may be projected onto the rendered image 120 as a rendered object 121. The electronic device may represent an effect of light related to the rendered object 121 by performing ray tracing using rays 111. For example, the effect of light may include light reflection by the rendered object 121, light reflection between the rendered object 121 and another object, shadow of the rendered object 121, and the like.

Ray tracing is a rendering technology for tracing back a path of light using the rays 111 directed from the view point to the scene object 130. For example, when a light source 140 affecting the scene object 130 is detected using the rays 111, an effect of the light source 140 on the scene object 130 may be calculated and the rendered object 121 of the rendered image 120 may be represented. The reality of the rendered object 121 may be improved according to the variety of rays 111. When the number of rays 111 is insufficient, an artifact may occur in the rendered image 120. However, as the number of rays 111 increases, the amount of computation required for ray tracing may also increase. Thus, the effective use of the rays 111 may be required.

According to an embodiment, the electronic device may derive an optimal rendering result based on the limited number of rays 111 using a neural sampling map generation model and a neural reconstruction model. The neural reconstruction model may perform reconstruction such as denoising and/or super-sampling on an input rendered image. The neural sampling map generation model may generate a sampling map using a warping result of output data of the neural reconstruction model. An image processing process using the neural sampling map generation model and the neural reconstruction model will be described in more detail below.

Figure 2:
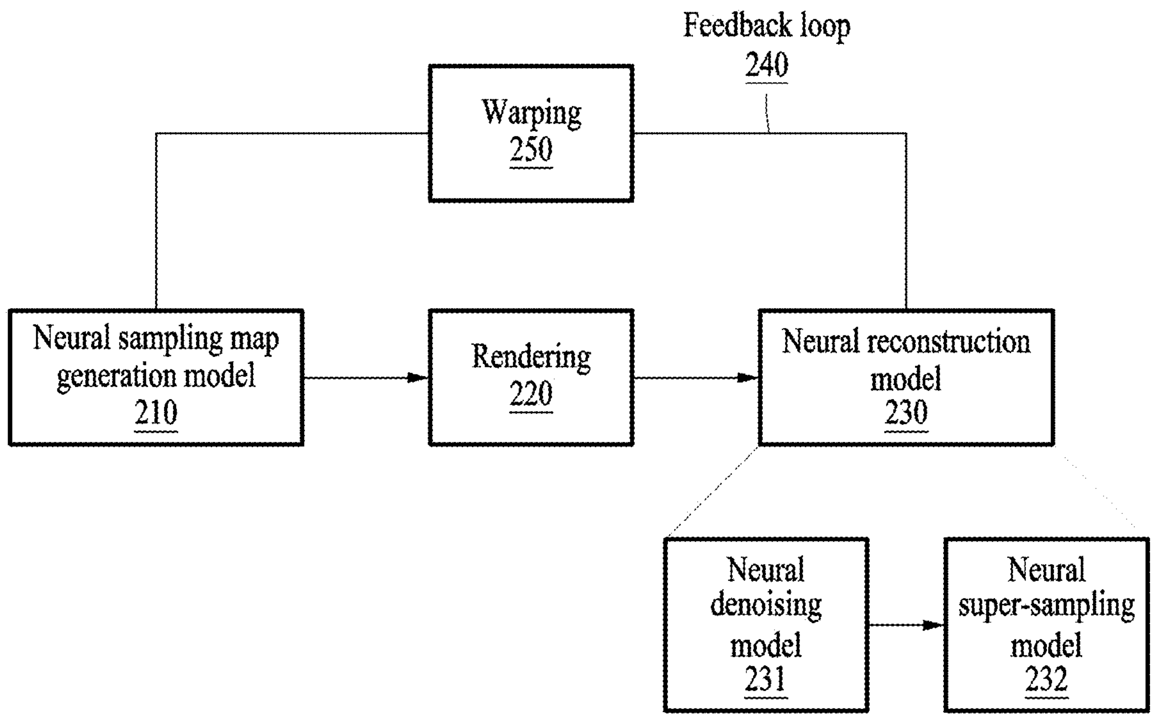
FIG. 2 is a diagram illustrating an example of an image processing process using a neural sampling map generation model and a neural reconstruction model according to an embodiment.

FIG. 2 is a diagram illustrating an example of an image processing process using a neural sampling map generation model and a neural reconstruction model according to an embodiment. Referring to FIG. 2, a neural sampling map generation model 210 may generate a sampling map based on warped image data. The warped image data may include a warped image frame. The warped image data may be generated by a warping operation 250. The warping operation 250 may be performed based on change data corresponding to a change between rendered image data at a previous time point and rendered image data at a current time point. For example, the change data may include a motion vector of a corresponding pixel between the rendered image data at the previous time point and the rendered image data at the current time point.

According to the warping operation 250, previous data corresponding to the rendered image data at the previous time point may be converted into current data corresponding to the rendered image data at the current time point. For example, reconstructed image data at the previous time point may be converted to warped image data at the current time by the warping operation 250. The warping operation 250 may be performed in a feedback loop 240. The feedback loop 240 may reflect information at the previous time point on information at the current time point. Since the warped image data at the current time point is not obtained through a rendering operation 220 and the neural reconstruction model 230, the warped image data at the current time point may be different from reconstructed image data at the current time point. However, the warped image data at the current time point may be used to efficiently estimate the reconstructed image data at the current time point.

A sampling map may designate a sampling number, a sampling position, or a combination thereof for each pixel of the rendered image data. The rendered image data may be rendered by performing the ray tracing on each pixel of the rendered image data using the sampling map. The rendered image data may include a rendered image frame. The sampling map may have the same resolution as that of the rendered image frame. The rendered image frame may include a plurality of pixels. A pixel value (e.g., a color value) of each pixel may be determined through the rendering operation 220. The rendering operation 220 may correspond to rendering pipeline that includes ray tracing.

In the ray tracing process, a path of a ray of each pixel may be traced back, and thus, a pixel value of each pixel may be determined. The number of rays used for each pixel may correspond to the sampling number. A point on a rendered image through which each ray passes may correspond to a sampling position. A uniform sampling number may be applied to all pixels of the rendered image frame, and an individual sampling number may be determined for each pixel of the rendered image frame. When the number of rays is insufficient, an artifact may occur in the rendered image. However, as the number of rays increases, the amount of computation required for ray tracing may also increase. Thus, the effective use of the rays may be required. The neural sampling map generation model 210 may derive a sampling map having effective sampling number and sampling position.

The neural reconstruction model 230 may generate reconstructed image data based on the rendered image data. The neural reconstruction model 230 may include a neural denoising model 231 and/or a neural super-sampling model 232. The neural reconstruction model 230 may perform image reconstruction using the neural denoising model 231 and the neural super-sampling model 232. The neural denoising model 231 may generate denoised image data by performing denoising on the rendered image data. The neural super-sampling model 232 may perform super-sampling on the denoised image data to generate super-sampled image data. FIG. 2 shows an example in which the neural denoising model 231 is located in front of the neural super-sampling model 232, however, the neural super-sampling model 232 may be located in front of the neural denoising model 231. That is, FIG. 2 shows an example in which the neural denoising model 231 may provide the denoised image data to the neural super-sampling model 232, but in some examples, the operations may be reversed, and the neural super-sampling model 232 may provide an input to the neural denoising model 231.

The neural sampling map generation model 210, the neural reconstruction model 230, the neural denoising model 231, and the neural super-sampling model 232 each may each include a neural network. The neural network may include a deep neural network (DNN) including a plurality of layers. The DNN may include at least one of a fully connected network (FCN), a convolutional neural network (CNN), or a recurrent neural network (RNN). For example, at least some of the layers included in the neural network may correspond to the CNN, and others may correspond to the FCN. The CNN may be referred to as a convolutional layer, and the FCN may be referred to as a fully connected layer. According to an embodiment, the neural reconstruction model 230 may correspond to a neural auto encoder that includes a neural encoder and a neural decoder.

The neural network may be trained based on deep learning and perform inference suitable for a training purpose by mapping input data and output data that are in a nonlinear relationship to each other. Deep learning is a machine learning technique for solving a problem such as image or speech recognition from a big data set. Deep learning may be construed as an optimization problem solving process of finding a point at which energy is minimized while training a neural network using prepared training data. Through supervised or unsupervised learning of deep learning, a structure of the neural network or a weight corresponding to a model may be obtained, and the input data and the output data may be mapped to each other through the weight. When a width and a depth of the neural network are sufficiently great, the neural network may have a capacity sufficient to implement a predetermined function. The neural network may achieve an optimized performance by learning a sufficiently large amount of training data through an appropriate training process.

In the following description, the neural network may be represented as being trained "in advance." Being trained "in advance" may refer to being trained before the neural network "starts." That the neural network "starts" may refer to that the neural network is ready for inference. For example, that the neural network "starts" may indicate that the neural network is loaded into a memory, or that input data for inference is input into the neural network after the neural network is loaded into the memory.

The reconstructed image data may include a reconstructed image feature corresponding to intermediate data of the neural reconstruction model 230 and/or a reconstructed image frame corresponding to output data of the neural reconstruction model 230. The reconstructed image data may include denoised image data and/or super-sampled image data. The denoised image data may include a denoised image feature corresponding to intermediate data of the neural denoising model 231 and/or a denoised image frame corresponding to output data of the neural denoising model 231. The super-sampled image data may include a super-sampled image feature corresponding to intermediate data of the neural super-sampling model 232 and/or a super-sampled image frame corresponding to output data of the neural super-sampling model 232.

The reconstructed image data may be provided to the neural sampling map generation model 210 along the feedback loop 240. A result of the warping operation 250 based on the reconstructed image data may be provided to the neural sampling map generation model 210. The reconstructed image frame (e.g., the denoised image frame) may have a smaller number of artifacts and/or higher resolution (e.g., the super-sampled image frame) than those of the rendered image frame. The reconstructed image data may be provided to a user through various display devices.

Figure 3:
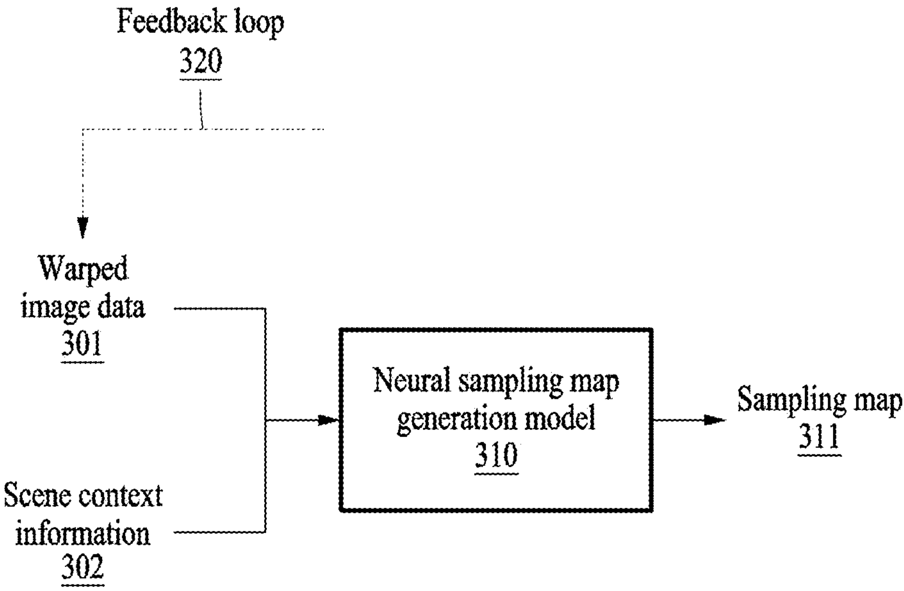
FIG. 3 is a diagram illustrating an example of an operation of a neural sampling map generation model according to an embodiment.

FIG. 3 is a diagram illustrating an example of an operation of a neural sampling map generation model according to an embodiment. Referring to FIG. 3, a neural sampling map generation model 310 may generate a sampling map 311 based on warped image data 301 and scene context information 302. The warped image data 301 and the scene context information 302 may be concatenated and input to the neural sampling map generation model 310. A warping operation of reconstructed image data at a previous time point may be performed along a feedback loop 320. The reconstructed image data at the previous time point may be converted into the warped image data 301 at the current time point by the warping operation.

For example, the warped image data 301 may be generated by warping reconstructed image data at a first time point based on first change data corresponding to a change between rendered image data at the first time point and rendered image data at a second time point. The first change data may include a motion vector of a corresponding pixel between the rendered image data at the first time point and the rendered image data at the second time point. The sampling map 311 that designates a sampling number, a sampling position, or a combination thereof for each pixel of the rendered image data at the second time point may be generated by executing the neural sampling map generation model 310 based on the warped image data 301 and the scene context information 302. The second time point may refer to a time point after the first time point.

The scene context information 302 may include, for example, normal information, depth information, albedo information, an object identifier (ID), material information, an object type, and the like. The scene context information 302 may be generated in advance or may be easily obtainable in relation to a 3D scene. According to an embodiment, the scene context information 302 may include information about visual characteristics of a scene object represented by the rendered image data at the second time point. The visual characteristics may indicate factors affecting the appearance of a scene object such as a material thereof. For example, a scene object formed of a reflective material and a scene object formed of a matte material may have different visual characteristics from each other. The scene context information 302 may be determined based on setting parameters assigned to the scene object in advance when designing a 3D scene. In this case, the scene context information 302 may be used at little additional cost in the process of generating the sampling map 311. The neural sampling map generation model 310 may be trained to assign appropriate sampling number, sampling position, or a combination thereof to each pixel based on the visual characteristics of each scene object. The neural sampling map generation model 310 may be trained based on Equation (1) below.

$$L = \alpha\,\mathrm{Loss}_{DN} + \beta\,\mathrm{Loss}_{SS} \quad (1)$$

In Equation (1), L may represent a loss value for training the neural sampling map generation model 310, $\mathrm{Loss}_{DN}$ may represent a loss value of a neural denoising model, $\mathrm{Loss}_{SS}$ may represent a loss value of a neural super-sampling model, and a and B each may represent a fusion coefficient.

When the sampling map 311 is generated, the rendering and reconstruction using the sampling map 311 may be performed. For example, the rendered image data at the second time point may be rendered by performing the ray tracing on each pixel of the rendered image data at the second time point according to the sampling number, sampling position, or a combination of the sampling number and the sampling position of the sampling map 311. The reconstructed image data at the second time point may be generated by executing a neural reconstruction model based on the rendered image data at the second time point.

The neural reconstruction model may include a neural denoising model and a neural super-sampling model. The reconstructed image data at the first time point may include denoised image data generated by the neural denoising model and super-sampled image data generated by the neural super-sampling model. The warped image data 301 may include warped denoised image data generated by warping the denoised image data and warped super-sampled image data generated by warping the super-sampled image data.

Figure 4A:
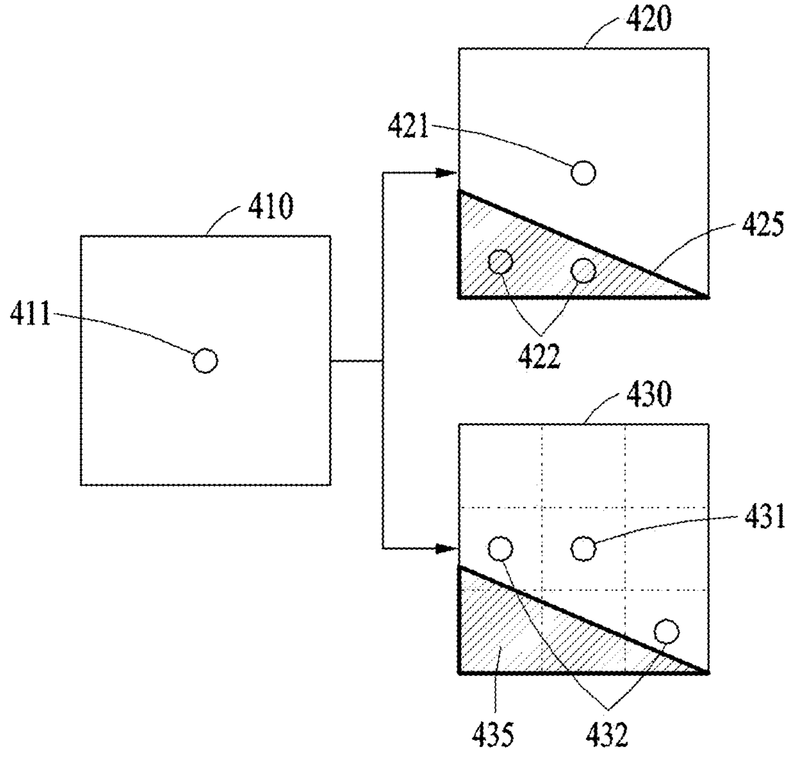
FIG. 4A is a diagram illustrating an example of an effect of reconstructed image data and scene context information about a sampling map according to an embodiment.

FIG. 4A is a diagram illustrating an example of an effect of reconstructed image data and scene context information about a sampling map according to an embodiment. According to embodiments, a neural sampling map generation model may generate a sampling map to perform integrated adaptive sampling based on context information and/or reconstructed image data (e.g., denoised image data and super-sampled image data).

Referring to FIG. 4A, a sampling point 411 may be assigned to a pixel 410 according to sampling per pixel (1SPP). According to embodiments, when feedback of the denoised image data is used, sampling points 422 may be additionally assigned onto a reflective object 425 in addition to a sampling point 421 of a pixel 420 corresponding to the sampling point 411. Since the reflective object 425 has a higher noise variance characteristic compared to a matte material, image quality may be improved through additional sampling. According to embodiments, the additional sampling may be performed as performed with the sampling points 422 since the context information and/or the denoised image data are used.

Figure 4B:
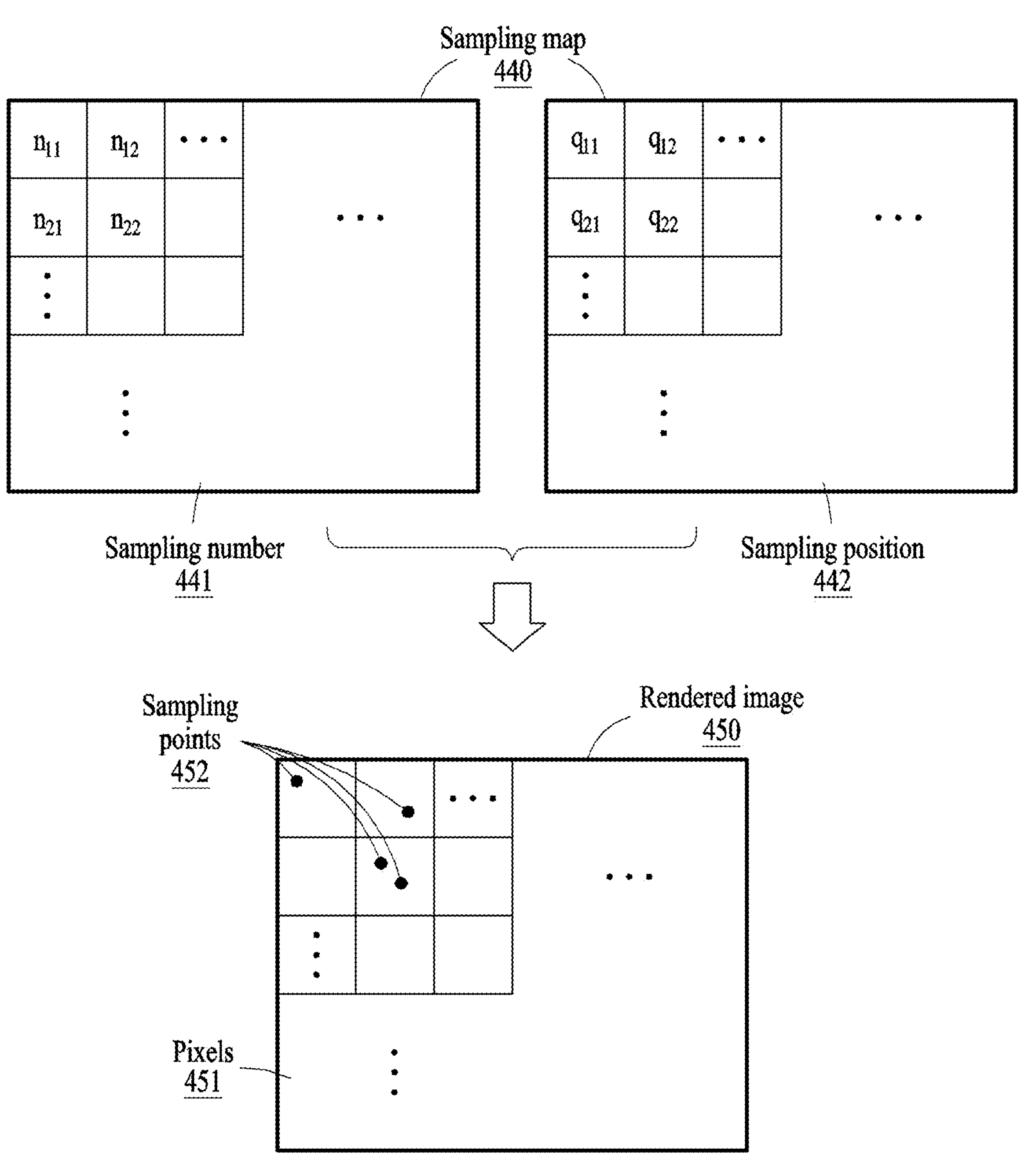
FIG. 4B is a diagram illustrating an example of a rendering operation performed based on a sampling map according to an embodiment.

When the super-sampling is performed, each pixel may be divided into a plurality of sub-pixels. According to embodiments, when feedback of super-sampled image data is used, sampling points 432 may be additionally assigned to other sub-pixels (i.e., pixel 430 has 9 sub-pixels as shown in FIG. 4B) to which a sampling point 431 does not belong, in addition to the sampling point 431 of a pixel 430 corresponding to the sampling point 411. For example, the sampling points 432 may be additionally assigned to sub-pixels with a high degree of edge, such as the periphery of the reflective object 435. As the sampling points 422 and 432 are adaptively added to appropriate positions, effective ray tracing may be performed.

FIG. 4B is a diagram illustrating an example of a rendering operation based on a sampling map according to an embodiment. Referring to FIG. 4B, sampling points 452 of pixels 451 of a rendered image 450 may be determined according to a sampling number 441 and/or a sampling position 442 of a sampling map 440. The sampling map 440 and the rendered image 450 may have the same resolution. For example, the resolution of the rendered image 450 may be i*j. In this case, the pixels 451 of the rendered image 450 may be represented as $p_{ij}$. The sampling may be performed on $P_{ij}$ according to $n_{ij}$ and/or $q_{ij}$, and the sampling points 452 may be determined by the sampling. For example, the rendered image 450 of FIG. 4B may correspond to an example in which $n_{11}$ is 1, $n_{12}$ is 1, $n_{21}$ is 0, and $n_{22}$ is 2. The positions of the sampling points 452 of $p_{ij}$ may be determined according to the sampling position 442. Each of the sampling positions may designate a position for a corresponding sampling number. For example, when $n_{11}$ is 1, $q_{11}$ may determine a position of one sample point in $p_{11}$, and when $n_{22}$ is 2, $q_{22}$ may determine positions of two sampling points in $p_{22}$.

A maximum value or an average value of the sampling number 441 according to the sampling map 440 may be limited by a preset threshold. A maximum value of the sum of the sampling numbers 441 of the pixels 451 may be limited, a maximum value of each of the sampling numbers 441 of the pixels 451 may be limited, or an average value of the sampling numbers 441 of the pixels 451 may be limited. As the number of rays increases, the amount of computation required for ray tracing may also increase. The amount of computation may be controlled by limiting the sampling number 441 corresponding to the number of rays.

The neural sampling map generation model may be trained under the above limitations. When there are no limitations described above, the neural sampling map generation model may be trained in a way of increasing the sampling numbers 441 of all pixels 451. In a case where there is a limit based on the maximum value of the sum of the sampling numbers 441 or the average value of the sampling numbers 441, when the sampling number of 0 is assigned to a pixel, sampling numbers that may be assigned to remaining pixels may increase. This balance may allow the sampling number 441 to be optimized in a situation where the sampling number 441 is limited.

Figure 5:
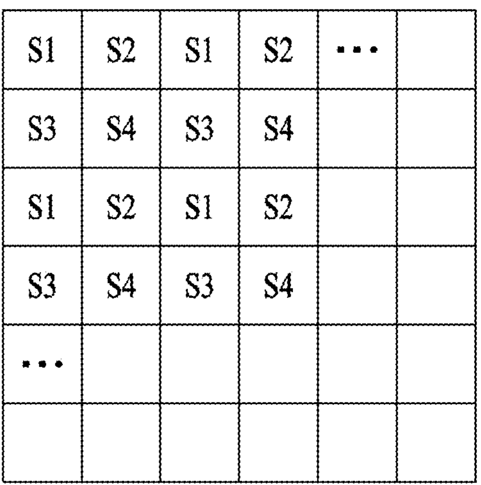
FIG. 5 is a diagram illustrating an example of space-to-depth conversion of super-sampled image data according to an embodiment.
Figure 5:
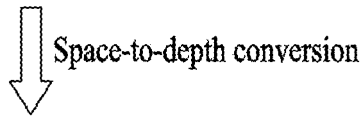

FIG. 5 is a diagram illustrating an example of space-to-depth conversion of super-sampled image data according to an embodiment. Referring to FIG. 5, super-sampled image data 510 may be converted into a sub-image set 520 by space-to-depth conversion. The super-sampled image data 510 may be generated by super-sampling on rendered image data or denoised image data. FIG. 5 may correspond to an example in which the super-sampled image data 510 is generated by super-sampling of 2*2.

The sub-image set 520 may include sub-images 521 to 524. The sub-image 521 may include a first corresponding pixel set S1 of the super-sampled image data 510. The remaining sub-images 522 to 524 may respectively include a second corresponding pixel set S2 to a fourth corresponding pixel set S4 of the super-sampled image data 510. Each of the sub-images 521 to 524 may be warped to generate warped super-sampled image data. The warped super-sampled image data may include warped sub-images respectively corresponding to the sub-images 521 to 524. The warped super-sampled image data including the warped sub-images may be provided to the neural sampling map generation model as feedback.

Figure 6:
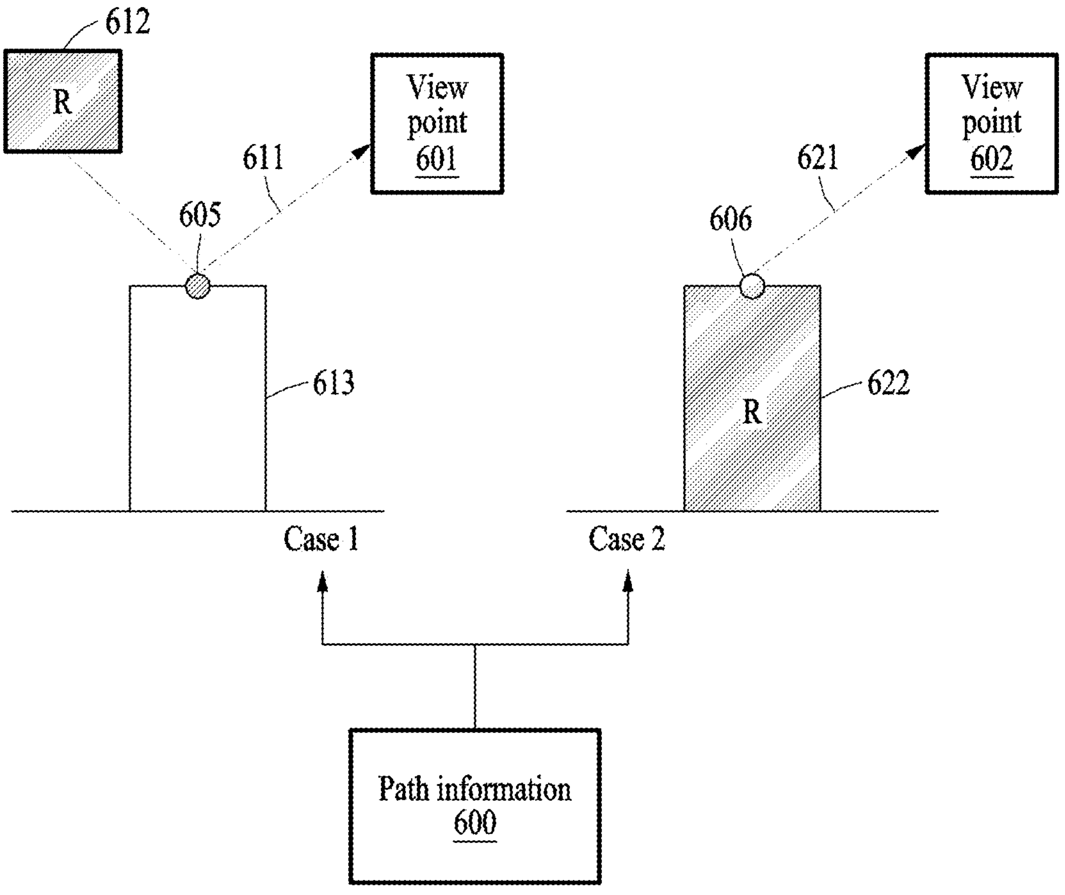
FIG. 6 is a diagram illustrating an example of path information according to an embodiment.

FIG. 6 is a diagram illustrating an example of path information according to an embodiment. Referring to FIG. 6, as shown in a Case 1, a pixel value corresponding to a point 605 of a scene object 613 observed at a view point 601 may be determined by ray tracing performed using a ray 611. Although the scene object 613 is white, the pixel value of the point 605 may be determined to be red due to the effect of a red illumination 612. On the other hand, as shown in a Case 2, when a scene object 622 is red, a pixel value corresponding to a point 606 of the scene object 622 observed at a view point 602 may be determined to be red. As described above, a path of a ray may affect the determination of a pixel value of each pixel. According to embodiments, path information 600 of the rays used for ray tracing may be used to generate a sampling map and/or reconstruct (e.g., denoise and super-sample) an image.

The path information 600 of each ray sample of the sampling map may be generated in the rendering process (e.g., the ray tracing process). For example, the path information 600 may include reflection information of the rays. The reflection information may include information about whether there are reflections in the paths of rays, information about the number of reflections, information about an object on which the reflection occurs, or a combination thereof. The path information 600 may be stored together with color information of each ray. The path information 600 may be input to the neural sampling map generation model and/or the neural reconstruction model (e.g., the neural denoising model and the neural super-sampling model). The path information 600 may be provided as input data to the neural reconstruction model together with the rendered image data. The path information 600 may be warped along a feedback loop, and the warped path information may be provided as input data to the neural sampling map generation model together with the warped image data and/or the scene context information.

For example, when the rendered image data at the second time point is rendered, the path information 600 of the rays used for ray tracing of the rendering may be generated. When the reconstructed image data at the second time point is generated, the neural reconstruction model may be executed based on the rendered image data at the second time point and the path information 600. The path information 600 may be warped based on the first change data corresponding to a change between the rendered image data at the first time point and the rendered image data at the second time point to generate the warped path information. The neural sampling map generation model may be executed based on the warped image data, the scene context information, and the warped path information.

Figure 7:
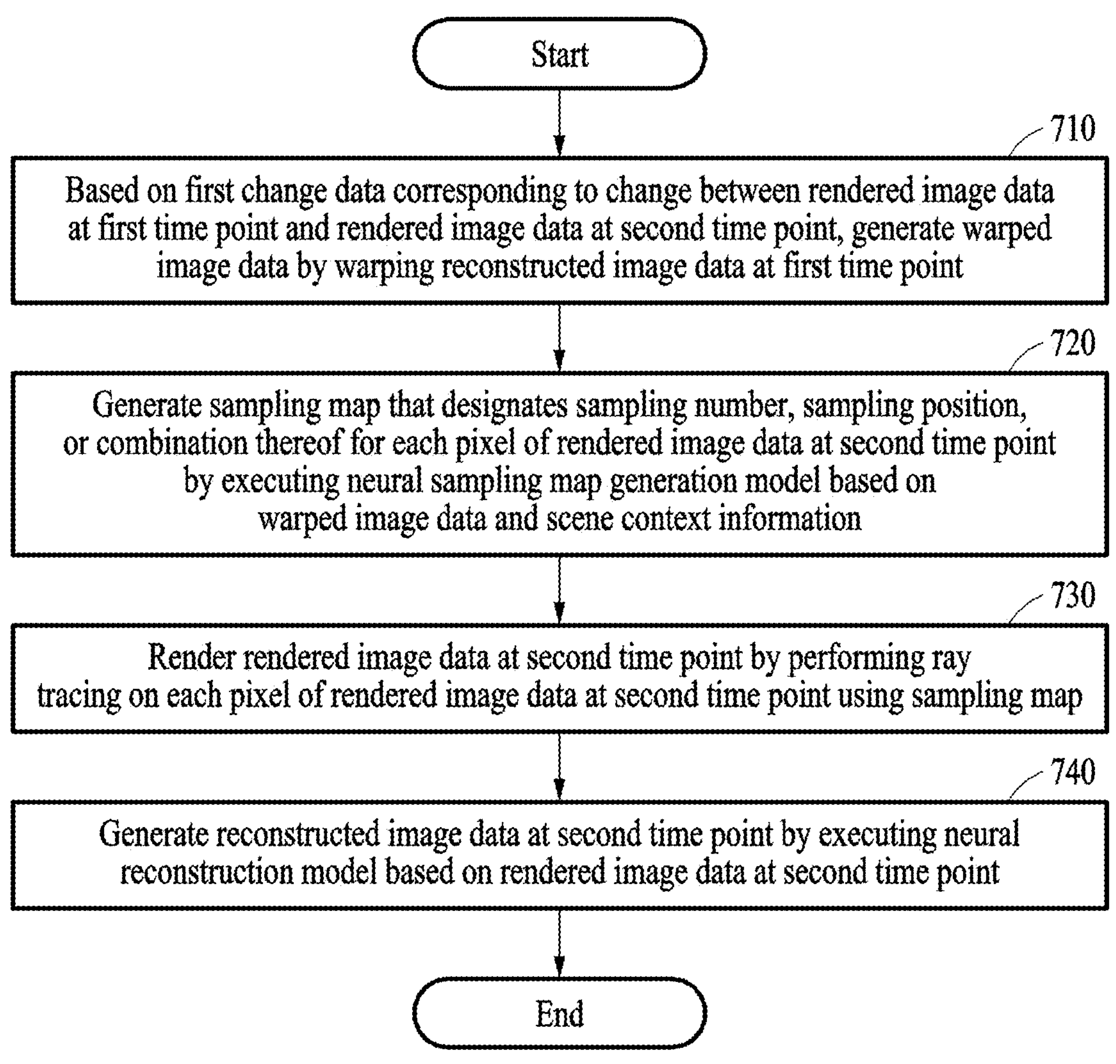
FIG. 7 is a flowchart illustrating an example of an image processing method using scene context information according to an embodiment.

FIG. 7 is a flowchart illustrating an example of an image processing method using scene context information according to an embodiment. According to an embodiment, the electronic device, based on first change data corresponding to a change between rendered image data at a first time point and rendered image data at a second time point, warped image data may be generated by warping reconstructed image data at the first time point in operation 710. A sampling map that designates a sampling number, a sampling position, or a combination thereof, for each pixel of the rendered image data at the second time point may be generated by executing a neural sampling map generation model based on the warped image data and scene context information in operation 720. The rendered image data at the second time point may be rendered by performing ray tracing on each pixel of the rendered image data at the second time point using the sampling map in operation 730. Reconstructed image data at the second time point may be generated by executing a neural reconstruction model based on the rendered image data at the second time point in operation 740.

The neural reconstruction model may include a neural denoising model and a neural super-sampling model, and the reconstructed image data at the first time point may include denoised image data generated by the neural denoising model and super-sampled image data generated by the neural super-sampling model.

The warped image data may include warped denoised image data generated by warping the denoised image data, and warped super-sampled image data generated by warping the super-sampled image data.

The super-sampled image data may be converted into a sub-image set by space-to-depth conversion, and the warped super-sampled image data may be generated by warping the sub-image set.

The scene context information may include information about visual characteristics of a scene object represented by the rendered image data at the second time point.

The first change data may include a motion vector of a corresponding pixel between the rendered image data at the first time point and the rendered image data at the second time point.

Operation 730 may include generating path information of rays used for the ray tracing.

The path information may include reflection information of the rays.

Operation 740 may include executing the neural reconstruction model based on the rendered image data at the second time point and the path information.

The electronic device may generate warped path information by warping the path information based on the first change data.

Operation 720 may include executing the neural sampling map generation model based on the warped image data, the scene context information, and the warped path information.

In addition, the description provided with reference to FIGS. 1 to 6, 8, and 9 may apply to the image processing method of FIG. 7.

Figure 8:
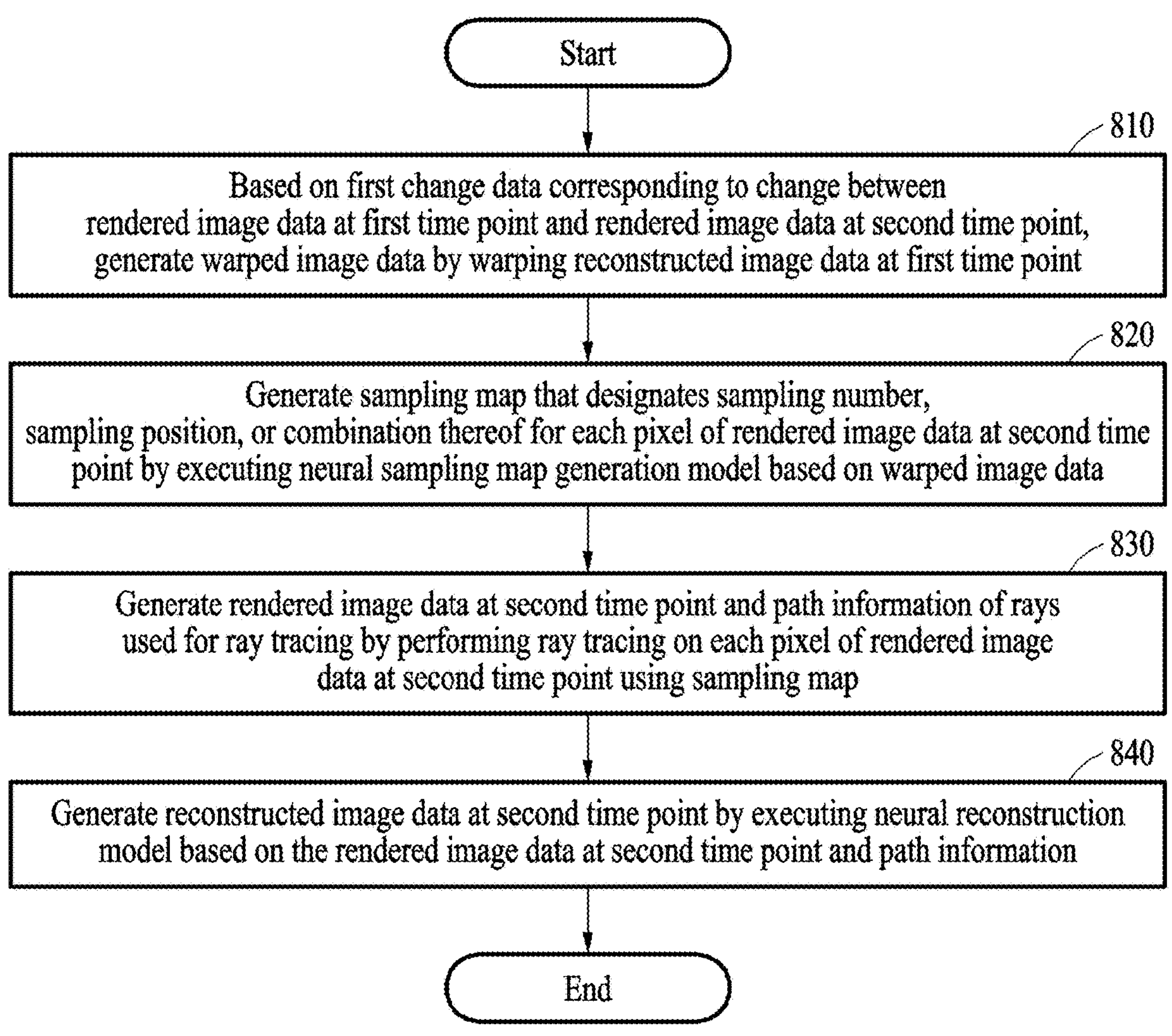
FIG. 8 is a flowchart illustrating an example of an image processing method using path information according to an embodiment.

FIG. 8 is a flowchart illustrating an example of an image processing method using path information according to an embodiment. Referring to FIG. 8, the electronic device, based on first change data corresponding to a change between rendered image data at a first time point and rendered image data at a second time point, may generate warped image data by warping reconstructed image data at the first time point in operation 810. The electronic device may generate a sampling map that designates a sampling number, a sampling position, or a combination thereof, for each pixel of the rendered image data at the second time point by executing a neural sampling map generation model based on the warped image data in operation 820. The electronic device may generate the rendered image data at the second time point and path information of rays used for ray tracing by performing the ray tracing on each pixel of the rendered image data at the second time point using the sampling map in operation 830. The electronic device may generate reconstructed image data at the second time point by executing a neural reconstruction model based on the rendered image data at the second time point and the path information in operation 840.

The path information may include reflection information of the rays.

The electronic device may generate warped path information by warping the path information based on the first change data.

Operation 820 may include executing the neural sampling map generation model based on the warped image data and the warped path information.

The neural reconstruction model may include a neural denoising model and a neural super-sampling model, and the reconstructed image data at the first time point may include denoised image data generated by the neural denoising model and super-sampled image data generated by the neural super-sampling model.

The warped image data may include warped denoised image data generated by warping the denoised image data, and warped super-sampled image data generated by warping the super-sampled image data.

Operation 820 may include executing the neural sampling map generation model based on the warped image data and the scene context information.

In addition, the description provided with reference to FIGS. 1 to 7 and 9 may apply to the image processing method of FIG. 8.

Figure 9:
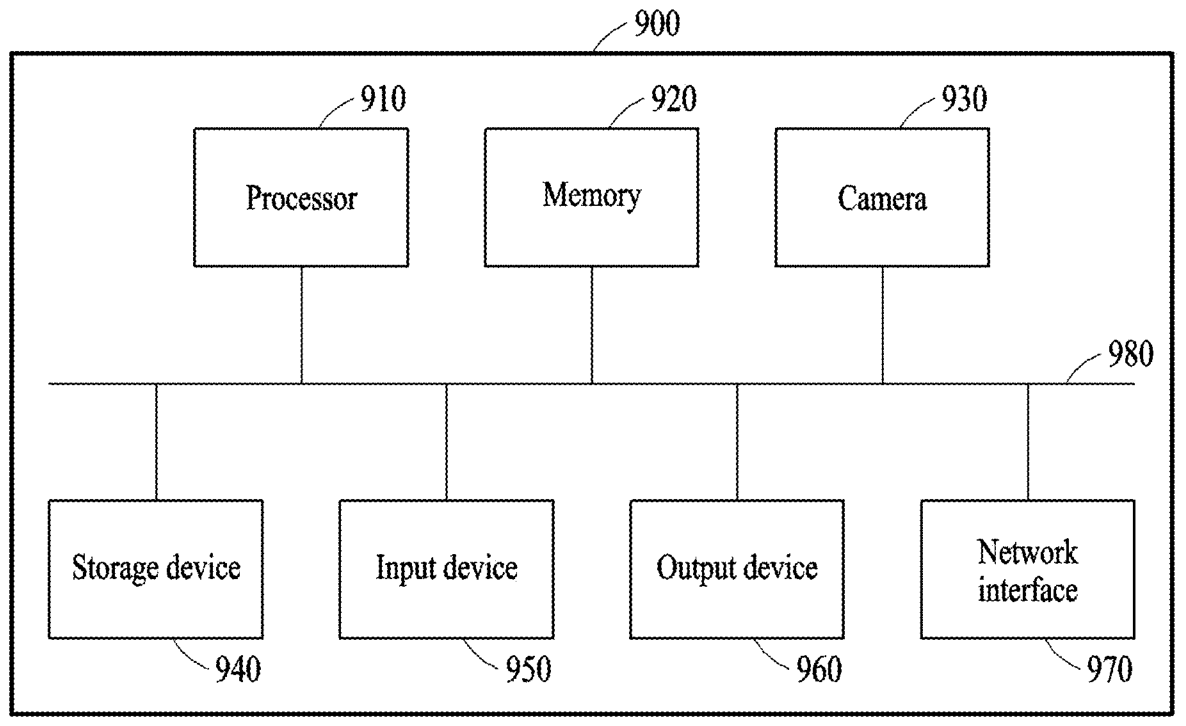
FIG. 9 is a block diagram illustrating an example of a configuration of an electronic device according to an embodiment.

FIG. 9 is a block diagram illustrating an example of a configuration of an electronic device according to an embodiment. Referring to FIG. 9, an electronic device 900 may include a processor 910, a memory 920, a camera 930, a storage device 940, an input device 950, an output device 960, and a network interface 970. The processor 910, the memory 920, the camera 930, the storage device 940, the input device 950, the output device 960, and the network interface 970 may communicate with each other via a communication bus 980. For example, the electronic device 900 may be embodied as at least a portion of a mobile device (e.g., a mobile phone, a smartphone, a personal digital assistant (PDA), a netbook, a tablet computer, a laptop computer, etc.), a wearable device (e.g., a smartwatch, a smart band, smart eyeglasses, etc.), a computing device (e.g., a desktop, a server, etc.), a home appliance (e.g., a television (TV), a smart TV, a refrigerator, etc.), a security device (e.g., a door lock, etc.), or a vehicle (e.g., an autonomous vehicle, a smart vehicle, etc.).

The processor 910 may execute instructions and functions in the electronic device 900. For example, the processor 910 may process instructions stored in the memory 920 or the storage device 940. The processor 910 may perform the operations described with reference to FIGS. 1 to 8. The memory 920 may include a non-transitory computer-readable storage medium or a non-transitory computer-readable storage device. The memory 920 may store instructions that are to be executed by the processor 910, and also store information associated with software and/or applications when the software and/or applications are being executed by the electronic device 900.

The camera 930 may capture a photo and/or a video. The storage device 940 may include a non-transitory computer-readable storage medium or a non-transitory computer-readable storage device. The storage device 940 may store a greater amount of information than the memory 920 and store the information for a long period of time. For example, the storage device 940 may include magnetic hard disks, optical disks, flash memories, floppy disks, or other forms of non-volatile memories known in the art.

The input device 950 may receive an input from a user through a traditional input scheme using a keyboard and a mouse, and through a new input scheme such as a touch input, a voice input and an image input. For example, the input device 950 may detect an input from a keyboard, a mouse, a touchscreen, a microphone or a user, and may include any other device configured to transfer the detected input to the electronic device 900. The output device 960 may provide a user with an output of the electronic device 900 through a visual channel, an auditory channel, or a tactile channel. The output device 960 may include, for example, a display, a touchscreen, a speaker, a vibration generator, or any other device configured to provide a user with the output. The network interface 970 may communicate with an external device via a wired or wireless network.

The embodiments described herein may be implemented using a hardware component, a software component, and/or a combination thereof. A processing device may be implemented using one or more general-purpose or special-purpose computers, such as, for example, a processor, a controller, an arithmetic logic unit (ALU), a digital signal processor (DSP), a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and generate data in response to execution of the software. For purpose of simplicity, the description of a processing device is used as singular; however, one skilled in the art will appreciate that a processing device may include multiple processing elements and/or multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or uniformly instruct or configure the processing device to operate as desired. Software and data may be stored in any type of machine, component, physical or virtual equipment, or computer storage medium or device capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described embodiments may be recorded in non-transitory computer-readable media including program instructions to implement various operations of the above-described embodiments. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as compact disc (CD) read-only memory (ROM) (CD-ROM) discs, digital versatile discs (DVDs), and/or Blue-ray discs; magneto-optical media such as optical discs; and hardware devices that are specially configured to store and perform program instructions, such as ROM, random access memory (RAM), flash memory (e.g., universal serial bus (USB) flash drives, memory cards, memory sticks, etc.), and the like. Examples of program instructions include both machine code, such as produced by a compiler, and files containing higher-level code that may be executed by the computer using an interpreter.

The above-described hardware devices may be configured to act as one or more software modules in order to perform the operations of the above-described embodiments, or vice versa.

As described above, although the embodiments have been described with reference to the limited drawings, a person skilled in the art may apply various technical modifications and variations based thereon. For example, suitable results may be achieved if the described techniques are performed in a different order and/or if components in a described system, architecture, device, or circuit are combined in a different manner and/or replaced or supplemented by other components or their equivalents.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. An image processing method comprising:

generating warped image data by warping first reconstructed image data corresponding to a first time point, based on first change data corresponding to a change between first rendered image data corresponding to the first time point and second rendered image data corresponding to a second time point;

generating a sampling map that designates a sampling number, a sampling position, or a combination of the sampling number and the sampling position, for each pixel of the second rendered image data corresponding to the second time point by executing a neural sampling map generation model based on the warped image data and scene context information;

rendering the second rendered image data corresponding to the second time point by performing ray tracing on each pixel of the second rendered image data corresponding to the second time point using the sampling map; and generating second reconstructed image data corresponding to the second time point by executing a neural reconstruction model based on the second rendered image data corresponding to the second time point.

2. The image processing method of claim 1, wherein the neural reconstruction model comprises a neural denoising model and a neural super-sampling model, and wherein the first reconstructed image data corresponding to the first time point comprises denoised image data generated by the neural denoising model and super-sampled image data generated by the neural super-sampling model.

3. The image processing method of claim 2, wherein the warped image data comprises:

warped denoised image data generated by warping the denoised image data; and warped super-sampled image data generated by warping the super-sampled image data.

4. The image processing method of claim 3, wherein the super-sampled image data is converted into a sub-image set by space-to-depth conversion, and wherein the warped super-sampled image data is generated by warping the sub-image set.

5. The image processing method of claim 1, wherein the scene context information comprises information about visual characteristics of a scene object represented by the second rendered image data corresponding to the second time point.

6. The image processing method of claim 1, wherein the first change data comprises a motion vector of a corresponding pixel between the first rendered image data corresponding to the first time point and the second rendered image data corresponding to the second time point.

7. The image processing method of claim 1, wherein the rendering of the second rendered image data corresponding to the second time point comprises generating path information of rays used for the ray tracing.

8. The image processing method of claim 7, wherein the path information of the rays used for the ray tracing comprises reflection information of the rays used for the ray tracing.

9. The image processing method of claim 7, wherein the generating of the second reconstructed image data corresponding to the second time point further comprises executing the neural reconstruction model based on the second rendered image data corresponding to the second time point and the path information of the rays used for the ray tracing.

10. The image processing method of claim 7, further comprising:

generating warped path information by warping the path information of the rays used for the ray tracing based on the first change data.

11. The image processing method of claim 10, wherein the generating of the sampling map comprises executing the neural sampling map generation model based on the warped image data, the scene context information, and the warped path information.

12. An image processing method comprising:

generating warped image data by warping first reconstructed image data corresponding to a first time point, based on first change data corresponding to a change between first rendered image data corresponding to the first time point and second rendered image data corresponding to a second time point;

generating a sampling map that designates a sampling number, a sampling position, or a combination of the sampling number and the sampling position, for each pixel of the second rendered image data corresponding to the second time point by executing a neural sampling map generation model based on the warped image data;

generating the second rendered image data corresponding to the second time point and path information of rays used for ray tracing by performing ray tracing on each pixel of the second rendered image data corresponding to the second time point using the sampling map; and generating second reconstructed image data corresponding to the second time point by executing a neural reconstruction model based on the second rendered image data corresponding to the second time point and the path information of the rays used for the ray tracing.

13. The image processing method of claim 12, wherein the path information of the rays used for the ray tracing comprises reflection information of the rays used for ray tracing.

14. The image processing method of claim 12, further comprising:

generating warped path information by warping the path information of the rays used for the ray tracing based on the first change data.

15. The image processing method of claim 14, wherein the generating of the sampling map comprises executing the neural sampling map generation model based on the warped image data and the warped path information.

16. The image processing method of claim 12, wherein the neural reconstruction model comprises a neural denoising model and a neural super-sampling model, and wherein the first reconstructed image data corresponding to the first time point comprises denoised image data generated by the neural denoising model and super-sampled image data generated by the neural super-sampling model.

17. The image processing method of claim 16, wherein the warped image data comprises:

warped denoised image data generated by warping the denoised image data; and warped super-sampled image data generated by warping the super-sampled image data.

18. The image processing method of claim 12, wherein the generating of the sampling map comprises executing the neural sampling map generation model based on the warped image data and scene context information.

19. A non-transitory computer-readable storage medium storing instructions that, when executed by a processor, cause the processor to perform the image processing method of claim 1.

20. An electronic device comprising:

a processor; and a memory configured to store instructions, wherein the instructions, when executed by the processor, cause the processor of the electronic device to:

generate warped image data by warping first reconstructed image data corresponding to a first time point based on first change data corresponding to a change between first rendered image data corresponding to the first time point and second rendered image data corresponding to a second time point;

generate a sampling map that designates a sampling number, a sampling position, or a combination of the sampling number and the sampling position, for each pixel of the second rendered image data corresponding to the second time point by executing a neural sampling map generation model based on the warped image data and scene context information;

render the second rendered image data corresponding to the second time point by performing ray tracing on each pixel of the second rendered image data corresponding to the second time point using the sampling map; and generate second reconstructed image data corresponding to the second time point by executing a neural reconstruction model based on the second rendered image data corresponding to the second time point.

* * * * *